JOHN W. BOYD, OF VEVAY, INDIANA.

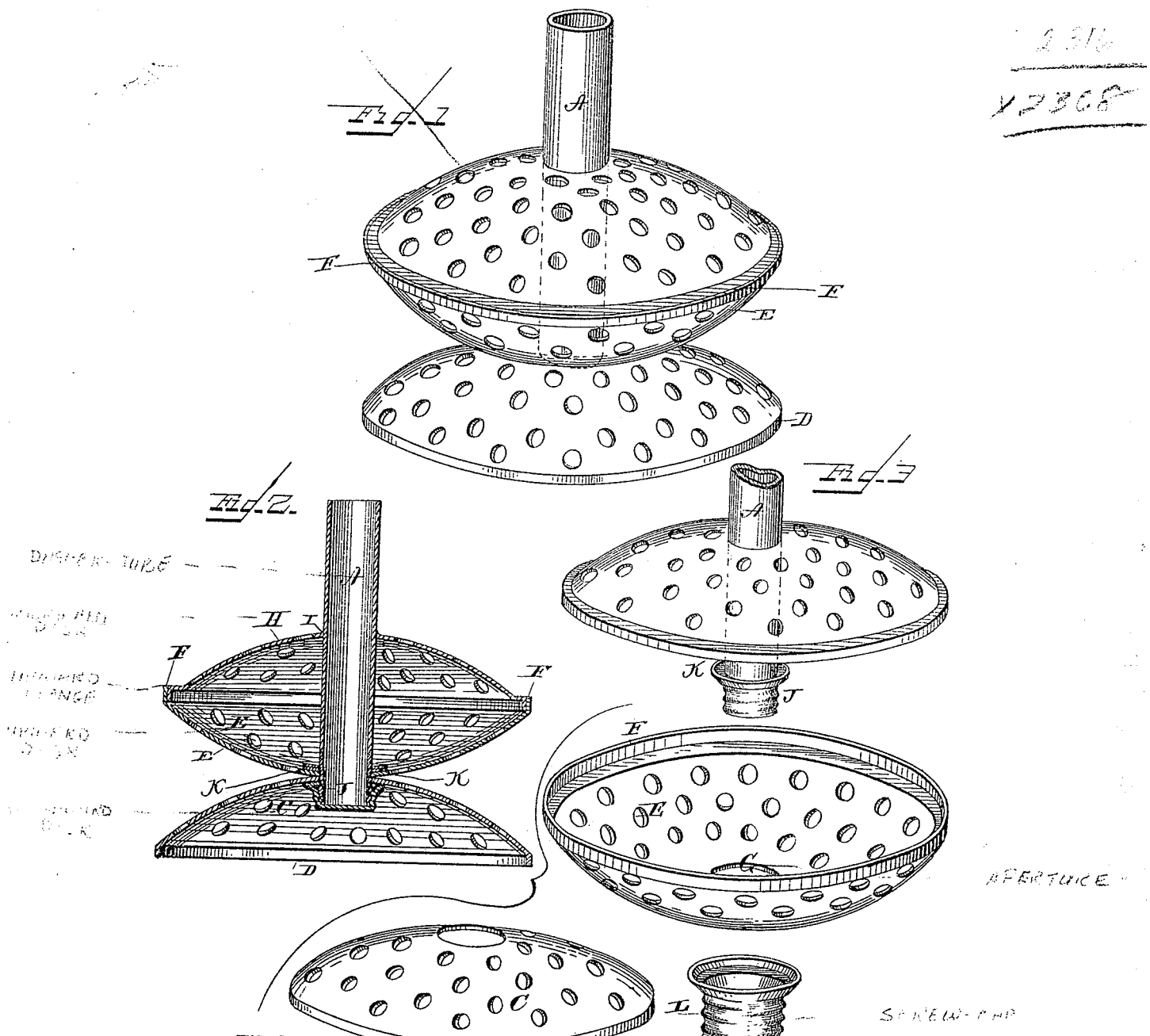

CHURN-DASHER.

SPECIFICATION forming part of Letters Patent No. 329,259, dated October 27, 1885.

Application filed August 7, 1885. Serial No. 173,835. (No model.)

*To all whom it may concern:*

Be it known that I, JOHN W. BOYD, a citizen of the United States, and a resident of Vevay, in the county of Switzerland and State of Indiana, have invented certain new and useful Improvements in Churn-Dashers; and I do hereby declare that the following is a full, clear, and exact description of the invention, which will enable others skilled in the art to which it appertains to make and use the same, reference being had to the accompanying drawings, which form a part of this specification, and in which—

Figure 1 is a perspective view of my improved churn-dasher. Fig. 2 is a vertical section of the same, and Fig. 3 is a perspective view of the parts of the dasher separated.

Similar letters of reference indicate corresponding parts in all the figures.

My invention has relation to reciprocating churn-dashers consisting of concavo-convex disks of metal having perforations; and it consists in the improved construction and combination of parts of the same, as hereinafter more fully described and claimed.

In the accompanying drawings, the letter A indicates a tube which forms a socket for the reception of the reciprocating dasher-staff A, and the tube is provided, a distance from its lower end, with a concavo-convex perforated disk, C, having its concave side facing downward, and having a downwardly-projecting flange, D, around its periphery. A concavo-convex disk, E, having perforations, and having an upwardly-projecting flange, F, around its periphery, is placed with its central aperture, G, upon the tube, having its concave side facing upward, and having its peripheral flange fitting around the flange of the other disk. A third concavo-convex disk, H, is placed with its central aperture, I, upon the tube, and has its concave side facing downward. The lower end of the tube is formed with a screw-thread, J, having a flange, K, at its upper end, and the central aperture of the concavo-convex disk E bears against this flange, while a screw-cap, L, is secured upon this threaded portion and forces the two concavo-convex perforated disks against the flange, holding the entire number of disks together. It will be seen that the cream will pass through the perforations of these disks when the dasher is reciprocated, and thus be thoroughly beaten up and worked, so as to break the butter-globules, and the lower disk will force the cream toward the center by having its concave side facing downward, whereupon the next disk will again give the cream an outward direction, which, however, will be broken by the uppermost disk intercepting the cream with its concave side and breaking up the globules.

The dasher may be easily cleaned, inasmuch as all the parts may be taken apart, and the screw-cap being removed from the lower end of the tube leaves that end open, so that it may be cleaned thoroughly and not retain any portion of the cream in its socket, as it would do if it were a socket having a closed lower end.

The entire dasher is simple of construction, and may be made at a very low cost, so that the dasher may be accessible to all parties having use for a churn-dasher, the preferable material for the dasher being sheet-tin.

By making the disks of the dasher concavo-convex great increase of strength is gained in the disks, together with the other advantages attained by this form, so that a thinner and lighter sheet metal may be used for the dasher than if the disks were flat.

Having thus described my invention, I claim and desire to secure by Letters Patent of the United States—

1. In a churn-dasher, the combination of a dasher-tube, a concavo-convex perforated disk secured upon the tube with its concave side facing downward, a concavo-convex perforated disk secured upon the tube with its concave side facing upward, and with its edges bearing against the edge of the upper disk, and an upper concavo-convex perforated disk secured upon the tube with its concave side facing downward, as and for the purpose shown and set forth.

2. In a churn-dasher, the combination of a dasher-tube forming a socket for the dasher-staff, and having a screw-threaded open end provided with a flange at the upper end of the thread, a perforated concavo-convex disk secured upon the dasher-tube with its concave side facing downward, and having a downwardly-projecting flange at its periphery, a concavo-convex perforated disk having an upwardly-projecting flange at its periphery, and having its concave side facing upward, and its central aperture bearing against the flange of the threaded end of the dasher-tube, the flange at its periphery fitting around the flange of the upper disk, an upper concavo-convex perforated disk having its concave side facing downward, and having its central aperture fitting against the central apertured portion of the disk above, and a screw-cap fitting upon the threaded end of the dasher-tube and confining the disks, as and for the purpose shown and set forth.

In testimony that I claim the foregoing as my own I have hereunto affixed my signature in presence of two witnesses.

JOHN W. BOYD.

Witnesses:
JOHN F. PATTON,
JOSEPH E. HART.